US011629074B2

United States Patent
Mykytiuk

(10) Patent No.: US 11,629,074 B2
(45) Date of Patent: Apr. 18, 2023

(54) METHOD FOR ACTIVATION OF CONCRETE MIXING WATER

(71) Applicant: Unique Equipment Solutions LLC, Littleton, MA (US)

(72) Inventor: Oleksandr Yuriiovych Mykytiuk, Kyiv (UA)

(73) Assignee: Unique Equipment Solutions LLC, Littleton, MA (US)

( * ) Notice: Subject to any disclaimer, the term of this patent is extended or adjusted under 35 U.S.C. 154(b) by 0 days.

(21) Appl. No.: 16/975,109

(22) PCT Filed: Feb. 15, 2019

(86) PCT No.: PCT/UA2019/000022
§ 371 (c)(1),
(2) Date: Aug. 21, 2020

(87) PCT Pub. No.: WO2019/164469
PCT Pub. Date: Aug. 29, 2019

(65) Prior Publication Data
US 2020/0392022 A1    Dec. 17, 2020

(30) Foreign Application Priority Data
Feb. 23, 2018   (UA) ............................... a 2018 01909

(51) Int. Cl.
C02F 1/46       (2006.01)
C02F 1/36       (2023.01)
C04B 40/02      (2006.01)

(52) U.S. Cl.
CPC .............. *C02F 1/4608* (2013.01); *C02F 1/36* (2013.01); *C04B 40/0286* (2013.01); *C02F 2201/46175* (2013.01); *C02F 2209/03* (2013.01)

(58) Field of Classification Search
CPC ...... C02F 1/32; C02F 1/46; C02F 1/72; C04B 20/02
See application file for complete search history.

(56) References Cited

U.S. PATENT DOCUMENTS

2020/0392022 A1* 12/2020 Mykytiuk ................ C02F 1/34

FOREIGN PATENT DOCUMENTS

| CN | 108689652 A | * | 10/2018 | ............ | C04B 28/02 |
|----|-------------|---|---------|------|------------|
| CN | 108821634 A | * | 11/2018 | ......... | C04B 40/0039 |
| RU | 2160242 C2  |   | 12/2000 | | |
| RU | 2188758 C1  |   | 9/2002  | | |
| RU | 2249573 C1  | * | 4/2005  | | |
| RU | 2249573 C1  |   | 4/2005  | | |
| RU | 112088 U1   |   | 1/2012  | | |
| RU | 2508273     |   | 2/2014  | | |
| RU | 2600353 C2  |   | 10/2016 | | |
| UA | 105294      |   | 3/2016  | | |
| UA | 110556      |   | 10/2016 | | |

OTHER PUBLICATIONS

Azharonok V.V. et al., "Acoustic-Radio Wave Activation of Tempering Water for Portland Cement Systems", Surface Engineering and Applied Electrochemistry, 2011, Allerton Press, Inc., Heidelberg, vol. 47, No. 5, pp. 419-427.
Dolinsky A.A., "Use of cavitation technologies in the processing of liquid heterogeneous systems", Journal of Odessa National Academy of Food Technologies, 2014, vol. 45, No. 3, ISSN 2072-8730, pp. 9-13.
Fokin G.A., "Acoustic and vortex fields in water-containing systems: monograph", 2013.
Petrov A.G. et al., "Improving the properties of cement stone by ultrasonic activation of the mixing water", Proceedings of the 57th scientific and technical conference of students and young scientists, 2011, pp. 112-116.
Petrov A.G., "Road cement concrete on ultrasonic activated mixing water", abstract of dissertation, 2013.
Promtov M.A., "Prospects of Cavitation Technologies Application for Intensification of Chemical Technological Processes", 2008, vol. 14, No. 4, pp. 861-869.
Savenkov A.I., "Concretes activated by high-voltage impulse treatment: abstract of dissertation", 2000.
Yudina A.F., "Resource-saving technology of concrete work based on the use of electro-treated mixing water", Dissertation, Saint Petersburg, 2009.

* cited by examiner

*Primary Examiner* — Walter D. Griffin
*Assistant Examiner* — Cameron J Allen
(74) *Attorney, Agent, or Firm* — Loginov & Associates, PLLC; William A. Loginov

(57) ABSTRACT

The invention relates to a method for activation of concrete mixing water. The method includes preliminary action on the mixing water in continuous flow by pulsed high-voltage electrohydraulic discharges with supply DC voltage from 500 V to 5000 at a pulse frequency from 2 Hz to 10,000 Hz and a current from 0.1 A to 10 A on electrodes of copper and/or iron and/or titanium. Then the water is treated in a mechanical and/or ultrasonic cavitator in the developed cavitation mode and at a water pressure from 0.8 atm to 6 atm without addition of plasticizers and/or surface-active agents.

2 Claims, No Drawings

METHOD FOR ACTIVATION OF CONCRETE MIXING WATER

The claimed invention relates to the building materials industry and it may be used in production of concrete mixtures in manufacturing prefabricated reinforced concrete and in monolithic construction.

A method for introducing a polymer during preparation of a bitumen-concrete mixture is known, the method is unique in that the polymer is introduced directly into a mineral portion of the bitumen-concrete mixture, and it is retained under the mixing temperature after the components are mixed during 1.5-2 hours (patent of Ukraine No. 105294, publ. on Mar. 10, 2016).

Also, these are known:

a method for preparing concrete mixtures by mixing cement, mineral fillers and tempering water activated by a magnet field, or by common simultaneous impact by the magnet field and electrical current, the method is unique in that the activation of the tempering water in a working gap of the apparatus is made by the magnet field having an intensity of 630 kA/m÷640 kA/m, an activation time of 0.9 s÷0.11 s, wherein when the humidity of the fillers is increased, the activation time is increased for up to 0.16 s÷0.18 s, or the intensity of the magnet field for up to 660 kA/m, or both the activation time and the intensity of the magnet field are increased, according to the maximal plasticization of the concrete mixture; during activation by the common simultaneous impact by the magnet field and electrical current, the value of the current is set to 0.18 A÷0.2 A, with the increase for up to 0.5 A or 20 A÷25 A, with increase for up to 250 A, depending on the apparatus structure (patent of the RF No. 2508273, publ. on Feb. 27, 2014);

a method for producing a concrete by adding a pretreated activated water to a cement-sand mixture taken in certain proportions and their mixing, the method is unique in that the water is activated by subjecting it to high-voltage pulse discharges having the pulse energy of from 312 J to 625 J and a discharge repetition rate of from 1 Hz to 4 Hz (patent of Ukraine No. 110556, publ. on Oct. 10, 2016).

Main drawbacks for said technical solutions in the above-listed analogues are the following: characteristically high coefficient of hardness variation of the concrete properties and relatively high water waste and plasticizing and/or other additives under other equal conditions that increases costs for manufacturing the concrete mixture significantly with necessary values of its hardness and plasticity.

The one that is the closest to the claimed invention, according to the set of features, is a method for producing a concrete by adding a pretreated activated water to a cement-sand mixture taken in certain proportions and their mixing, the method is characterized in that the water is activated by subjecting it to high-voltage pulse discharges having the pulse energy of from 312 J to 625 J and a discharge repetition rate of from 1 Hz to 4 Hz (patent of Ukraine No. 110556, publ. on Oct. 10, 2016).

Drawbacks of the prototype are the following:

it requires relatively large amount of the tempering water of the concrete mixture;

it does not enable a sufficient plasticity level of the concrete mixture;

it does not provide a sufficient hardness of the concrete at 28th day without use of surfactants or other additives;

it does not indicate an expected effect from the water activation.

The underlying problem of the invention is to increase the hardness and plasticity of the concrete, as well as to reduce the amount of water that is necessary to produce the concrete mixture, and not to use surfactants and other additives.

The technical problem is solved by performing a novel type of operation of preactivation of water that allows to create a volume non-linear cavitation and to obtain water having novel physical and chemical properties, namely: by pretreatment of water (that is used for tempering the concrete mixture in a combination of water and cement only) by electrospark cavitation in a flow through mode with usage of copper and/or iron and/or titanium electrodes, with necessary parameters of direct current voltage, current strength, under the given pulse rate, followed by treatment of water by a mechanical and/or ultrasound cavitator in a developed cavitation mode in the flow through with a given water pressure value.

The proposed invention operates as follows.

Firstly, the water is treated by the electrospark cavitation in a flow through mode with usage of copper and/or iron and/or titanium electrodes, under the direct current voltage in the range of from 500 V to 5000 V, current strength in the range of from 0.1 A to 10 A, pulse rate in the range of from 2 Hz to 10000 Hz.

Then, this water is treated by a mechanical and/or ultrasound cavitator in a developed cavitation mode in the flow through under the water pressure in the range of from 0.8 atm to 6 atm.

Thereafter, the concrete mixture is made with the water prepared by the above-mentioned method. In order to temper the concrete mixture, water and cement are used, which are taken in the range of ratio water/cement respectively: from 4/10 to 8/10.

The technical effect of such treatment of tempering water is a reduction of water usage by 40÷50% in order to prepare the concrete mixture as compared with the untreated water, increase of the plasticity of the concrete mass, with reduction of water usage, due to reduction of the surface tension value by 10-30%, and increase of the concrete strength in the range of from 20% to 60% at 28th day, without introduction of plasticizers and/or surfactants into the mixture.

The invention claimed is:

1. A method for treating water that is added to a cement mixture so as to produce a concrete mixture, the treated water increasing plasticity of the concrete mixture and increasing strength of hardened concrete resulting from the concrete mixture, comprising the steps of:

pretreating the water by exposing the water to an electrospark cavitation reaction using at least one of copper, iron, and titanium electrodes, including applying a direct current voltage at the electrodes in a range of from 500 V to 5000 V, current strength in a range of from 0.1 A to 10 A, and a pulse rate in the range of from 2 Hz to 10000 Hz, followed by;

treating the water that has been exposed to the electrospark cavitation reaction by at least one of a mechanical and ultrasound cavitator in a developed cavitation mode as the water flows through the cavitator with a water pressure in a range of from 0.8 atm to 6 atm; and wherein the water is free of plasticizers and surfactants.

2. The method of claim 1, further comprising, mixing the treated water and cement in a range of ratio of water/cement mixture from 4/10 to 8/10.

* * * * *